United States Patent [19]
Stone

[11] Patent Number: 5,128,379
[45] Date of Patent: Jul. 7, 1992

[54] PROCESS FOR RAPID COOLING OF POLYURETHANE FOAM

[75] Inventor: Herman Stone, Hazleton, Pa.

[73] Assignee: PMC, Inc., Sun Valley, Calif.

[21] Appl. No.: 674,438

[22] Filed: Mar. 22, 1991

Related U.S. Application Data

[63] Continuation of Ser. No. 341,138, Apr. 20, 1989, abandoned.

[51] Int. Cl.$^5$ .............................. C08J 9/22; C08J 9/36
[52] U.S. Cl. ......................................... 521/50; 521/918
[58] Field of Search ................................... 521/50, 918

[56] References Cited

U.S. PATENT DOCUMENTS

| | | | |
|---|---|---|---|
| 3,061,885 | 11/1962 | Rogers et al. | 264/50 |
| 3,890,414 | 6/1975 | Ricciardi et al. | 264/45.1 |
| 4,537,912 | 8/1985 | Griswold | 521/53 |
| 4,649,162 | 3/1987 | Roche et al. | 521/133 |
| 4,764,536 | 4/1988 | Proksa et al. | 521/133 |

FOREIGN PATENT DOCUMENTS

| | | |
|---|---|---|
| 234212 | 6/1961 | Australia . |
| 1918212 | 11/1970 | Fed. Rep. of Germany . |
| 2910798 | 2/1981 | Fed. Rep. of Germany . |

Primary Examiner—Nathan M. Nutter
Assistant Examiner—Rabon Sergent
Attorney, Agent, or Firm—Davis, Hoxie, Faithfull & Hapgood

[57] ABSTRACT

An improved process for rapidly cooling hot freshly polymerized foam is provided by passage of a fluid coolant stream having a water vapor content which initially is in the range from slightly below to above the dew point. In preferred embodiments the cooling fluid stream is recirculated, and auxiliary blowing agents and gaseous reaction products are removed and recovered.

20 Claims, 1 Drawing Sheet

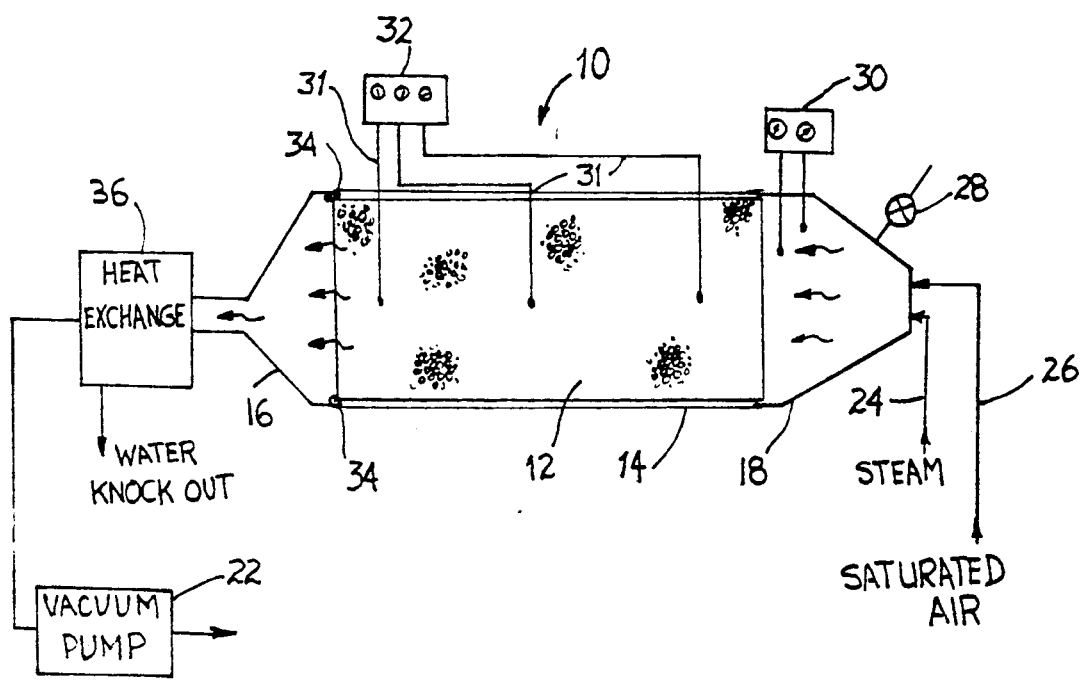

PROCESS FOR RAPID COOLING OF POLYURETHANE FOAM

This is a continuation of copending application Ser. No. 07/341,138 filed on Apr. 20, 1989, now abandoned.

FIELD OF THE INVENTION

This invention relates to the manufacture of substantially open-cell flexible cellular polyurethane foam compositions and specifically to the rapid cooling of hot freshly polymerized foam by passage of a gas stream with a high water vapor content through the foam mass.

BACKGROUND OF THE INVENTION

It has been found in the manufacture of flexible polyurethane foams, and particularly in the manufacture of polyether foams employing the continuous casting method, that the interior of the foamed mass may exhibit a burned or scorched appearance. This scorching is produced by (1) the high temperature resulting from the exothermic foam-forming reaction, which is usually above 250° F. and may be well over 300° F.; (2) the retention of the heat at the central region of the foam mass due to the low thermal conductance of the foam; and (3) the initiation of an oxidation reaction as ambient air infiltrates the block following expulsion of the $CO_2$ produced during the foam forming reaction. This oxidation reaction takes place with unreacted isocyanate and/or the hot foamed polymer and is undesirable for several reasons. Even at low levels, such oxidation can produce yellowing of light colored foams, which can make the foam product aesthetically unacceptable for some commercial uses. If the oxidation reaction is excessive, as evidenced by more than slight yellowing, a deleterious effect on foam properties will result. This undesired oxidation reaction can proceed with sufficient intensity to actually cause the foam to ignite and burn. The tendency towards this post-foaming oxidation reaction is greatest where the isocyanate index in the original formulation exceeds about 110, or when the rate of addition of polyol falls below the calculated value, as when there is a blockage in the polyol feed line or a pump failure. The tendency of the foam to scorch is also increased as the maximum exotherm is raised which increase can be caused by high levels of water in the formulation, e.g., above five parts per hundred of polyol.

The completion of the foam-forming polymerization reaction and the curing of the foam requires a finite period of time. Using commercial formulations well known to the art, the foam-forming reaction initially proceeds rapidly so that the foam gels or solidifies within about two minutes after the mixture is poured onto the casting surface. However, the maximum exotherm as determined by measuring the temperature at the interior of the foam block does not occur until about twenty to thirty minutes later. There is also a small proportion of remaining isocyanate which reacts over an even longer period of time, with additional cross-linking occurring as long as the temperature is above about 200° F.

The evidence that oxidation is responsible for scorch or fire can be derived from the normal cure temperature curve for the foam block. After reaching the maximum exotherm, the foam mass begins to cool. Up to this point, the foam contains carbon dioxide, vaporized reactants and reaction by-products which are expelled from the exposed surfaces of the block. These vapors are readily apparent during manufacture, as they escape through the upper surface which is not contained by the release paper or film on which the foam is cast and which substantially eliminates the escape of gases from all but the upper surface of the block. As the foam mass cools and the volume of the gaseous reaction products on the interior of the block reduces, ambient air enters and permeates the interior of the block. This is the first time that a significant amount of air can enter the foam. It will be appreciated by those skilled in the art that the passage of a stream of heated air into a block of freshly manufactured foam could result in an acceleration of the oxidation reaction and the promotion of scorching, or even ignition of the foam mass. Thermal degradation of the foam interior without oxidation is possible, but unlikely. If the oxidation reaction generates heat more rapidly than the heat can be dissipated, then degradation will occur and can become a runaway reaction. Passage of air can actually promote or accelerate the oxidation reaction, at least until the air flow is sufficient to carry heat away more rapidly than it is being generated by the undesired reaction. Because low air flow rates, such as a localized draft, can increase the hazard of scorch or fire, there is a minimum effective flow rate that should be met to assure safe cooling.

The art has long recognized the desirability of a process which could be efficiently and cost effectively employed to rapidly cure freshly manufactured cellular polyurethane foam without interfering with the development of optimum physical properties. Among the many economies to be achieved would be the ability to reduce storage space and time, material handling and delays in processing orders from customers.

Furthermore, as environmental concerns are heightened, regulations prohibiting the discharge into the atmosphere of gaseous reaction by-products from the foam making process are becoming more common. Processes that provide for the capture and recovery of these compounds will be preferred, if not required in the future.

Various processes for treating flexible, air permeable cellular polyurethane foam to reduce the time required for curing the foam have been disclosed in the art.

A process for rapidly and uniformly cooling a freshly made section or mass of flexible, substantially open-cell polyurethane foam to improve its physical properties is disclosed in U.S. Pat. No. 3,890,414 which issued on Jun. 17, 1975. The disclosure of U.S. Pat. No. 3,890,414 is incorporated herein by reference. That process contemplates inducing a pressure drop across at least two opposing gas permeable surfaces of a hot, freshly polymerized, open-cell block of polyurethane foam to induce the passage through the block of a draft of cooling gas having an initial temperature of about 80° F., or less. To the extent that this prior art process disclosed the initial moisture content, or relative humidity of the cooling gas stream that contacted the hot foam, it was well below the dew point or saturation level at the ambient temperature of about 75° F. This prior art method also discloses the use of dry nitrogen gas, and of dry chilled air to effect the rapid cooling of the treated foam.

U.S. Pat. No. 3,061,885, issued Nov. 6, 1962, discloses a process for accelerating the rate of cure of substantially open-cell flexible cellular polyurethane foam employing the steps of crushing the foam material and impinging the surface of the foam with a gaseous stream of air from jets for from 2 to 10 minutes at a temperature of about 100° to 250° F. and a pressure of about 5 to 100 psi.

U.S. Pat. No. 4,537,912 issued Aug. 27, 1985, describes a process for the rapid post curing of porous blocks of polyether polyurethane foam utilizing a combination of humidified air and gaseous ammonia, primary or secondary amines to improve the compression set values of the cured foam. The foam blocks are subjected to this gaseous atmosphere containing ammonia, primary or secondary amines which is at a temperature ranging from 50° to 150° F. and a relative humidity of from 50% to 100%, and preferably at 70% relative humidity and about 115° F. In one example, a block of polyether foam of unstated age was placed in an autoclave and live steam was introduced up to a pressure of twenty-one inches of mercury over a period of seven to ten minutes. [See col. 5, lines 52—65; col. 6, lines 3—13-.]According to the inventors, this treatment had no beneficial effect on reducing the curing time for the foam sample.

DESCRIPTION OF THE INVENTION

In the process of the present invention, foam blocks of any convenient size are subjected to the passage of a fluid coolant stream having a water vapor content which initially is in the range from slightly below to above the dew point. It is desirable to operate the process at a relatively low temperature since the rate at which the foam is cooled is a function of the heat capacity of the moisture laden cooling fluid and the initial temperature differential of the cooling fluid and the foam, as well as the flow rate of the cooling fluid. It will also be understood that while a relatively cooler saturated fluid coolant stream will contain less water vapor on a volumetric basis than a saturated fluid stream at a higher temperature, the former will also reduce the potential formation of condensation within the block. The operating parameters of initial temperature of the fluid coolant stream, its moisture content and volumetric flow rates can be varied to optimize the cooling rate based on the type, size, and reaction characteristics of the particular open cell polyurethane foam being treated.

In a preferred embodiment, the gas stream is at a temperature of from 80° F. to 225° F., but the process can beneficially be practiced with a high humidity fluid stream at a temperature which is less than that of the maximum internal temperature of the foam mass.

The process of this invention is an improvement of the process disclosed in U.S. Pat. No. 3,890,414 and permits the rapid and uniform cooling of the freshly polymerized polyurethane foam mass in an efficient and cost effective manner. The process of the present invention eliminates the potential problems associated with the post-foaming oxidation reaction described above by introducing a relatively high concentration of water vapor with the gas stream which serves the dual purpose of (1) more rapidly cooling the foam mass so that the temperature is quickly reduced to below the scorching temperature; and (2) introducing water to speed the reaction of unreacted NCO groups of the isocyanate.

The process of the invention permits efficiencies and cost savings in capital equipment and operating expenses by reducing the volume of cooling gas which must be passed through a given mass or block of foam to effect the desired reduction of temperature. Because of the high heat capacity of the moisture laden gas stream, a volume of as little as one half, or even less, of the volume of relatively drier air that would be required to obtain the same degree of cooling can be used.

The process of the invention also has the advantage of avoiding the introduction of gaseous ammonia or amines into the cooling stream which would require treatment, recovery, and/or removal, if it were desired to exhaust the coolant fluid stream into the atmosphere following its contact with the foam. The process of the invention also avoids the odor problem associated with residual amines remaining in the foam after treatment employing the prior art process. Assuming the proper formulation and mixing of the original foam-forming composition, the expanded foam block will contain sufficient catalyst to effect a complete curing of the fresh foam.

Moreover, the process of the present invention can be operated as a closed system to reduce heat and other energy requirements. By recycling the coolant fluid, the stream will gradually accumulate significant quantities of auxiliary organic blowing agents, if they are used, and reaction by-products, which can periodically be recovered in a side-stream system.

Although the improved process of the invention could be practiced by employing a fluid coolant stream of pure nitrogen or carbon dioxide, or other non-oxidizing or inert gas, the costs would be prohibitive for most commercial scale applications. In a preferred embodiment of the operation of the process, the concentration of carbon dioxide in the recycled fluid coolant stream is increased by virtue of the accumulation of carbon dioxide flushed from the foam mass. By increasing the concentration of carbon dioxide in the repeatedly or continuously recycled coolant stream, the concentration of oxygen will be reduced by a corresponding amount, and the occurrences of oxidation reactions within the foam mass will also be reduced. In a preferred embodiment of the process the fluid cooling stream will comprise approximately 10-12 mole percent or less of oxygen, rather that the 21% normally present in ambient air.

The use of steam, or of a fluid coolant stream with a water vapor content approaching the dew point, i.e., saturated air, has the advantage of increasing the specific heat or heat capacity of the fluid stream to more than double the specific heat of most gases. This increase in specific heat or heat capacity of the cooling fluid due the water vapor means that the fluid stream has a far greater ability to remove heat, and thereby more quickly cool the foam mass. For example, the water vapor concentration of saturated air at 102° F. is double that of air at 80° F. Also, since the moist gaseous coolant stream is able to lower the temperature of the foam more quickly relative to a gaseous stream without water, a lower volume of cooling gas is required to effect the same drop in temperature within the block. Since the water vapor concentration in saturated air increases with temperature, it is possible to obtain the benefits of cooling so long as the moisture laden gaseous stream is at a temperature which is below that of the hottest portion of the block. The exotherm of the polyurethane foam-forming reaction obviously will vary with the type of foam being produced, the size and shape of the block, the specific formulation, and the type and amount of blowing agent employed, e.g., water, methylene chloride or fluorocarbon. Internal block temperatures can range from 250° F. to 320° F., or higher, depending on these variables. In order to maintain a temperature differential, the incoming water vapor-containing gas stream can range in temperature from about 80° F. to 225° F., and preferably from about 100° F. to 215° F. In any event, the maximum temperature of the saturated gas stream should be at least 25° F. lower than the maximum temperature of the foam mass to be treated.

It will be appreciated that use of steam or saturated air at high temperature will initially produce a rapid decrease in temperature of the foam mass due to the high heat capacity per volume of gas passing through and contacting the hottest regions within the block. However, it is also apparent that in order to reduce the overall temperature of the block, it will be necessary to reduce the temperature of the moisture laden gas stream to that finally desired for the block. A high initial temperature is desirable to avoid condensation on the surface of the block. As will also be apparent, the greater the initial temperature differential between the cooling fluid stream and the foam, the more rapid will be the cooling of the block.

In a preferred embodiment of the process, the hot foam block is first contacted with a stream of saturated air at a relatively high temperature, thereby providing the maximum heat transfer capacity per volume of gas and a rapid incremental temperature drop at the center of the block, preferably to a temperature below 200° F. Reduction of the temperature at the center of the block to less than about 200° F. will eliminate the risk of scorch or fire. Further cooling of the block can be achieved by passage of a gas stream the temperature of which is gradually reduced to from about 180° F. to 120° F., and thereafter passing a gas stream having a relative humidity well below the saturation point and a temperature from about 110° F. to 80° F. to further cool the foam and drive out the excess moisture which may remain in the foam.

DESCRIPTION OF THE DRAWING

The FIGURE schematically depicts an apparatus 10 adapted to pass a gas stream through a substantially open cell flexible polyurethane cellular material 12 which employs a central housing 14, positioned between a downstream vacuum plenum 16 and an upstream plenum 18. The central housing 14 is adapted to receive in a close fitting manner a block of standard configuration. The block 12 can be inserted by removing one of the plenums, or by means of a tightly fitting door (not shown) in the central housing 14. Plenum 16 is attached by means of duct work or piping 20 to a vacuum pump 22, or other suitable means for drawing a vacuum on plenum 16. Upstream intake plenum 18 is connected by duct work or piping 24 to a source of steam such as the plant boiler (not shown), and by duct work or piping 26 to a source of heated humidified air. Plenum 18 is also provided with an air inlet valve 28 to permit the introduction of ambient air for passage through the foam block. Temperature and humidity sensing and readout gauges 30 are positioned in plenum 18 to measure the conditions of the incoming gas stream which will contact the foam block 12. One or more thermocouples 31 are inserted into the foam block, and related readout gauges 32 indicate the progress of the cooling, and its end point so that the treated block can be removed.

The cross-section of the central housing 14 is adapted to conform to the cross-section of block 12, which if produced on conventional commercial equipment will be either rectilinear or circular. Plenums 16 and 18 are likewise adapted to mate with the ends of central housing 14, and if necessary seals 34 are provided around the periphery of each end of the block to insure that the gas stream passes through the length of the block.

In a preferred embodiment of the process, (not shown), the gas stream exiting the plenum 16 is continuously recycled to plenum 18. In order to operate the system in such a continuous fashion it is necessary to cool the gas stream and remove water in heat exchanger 36. The use of a recirculating system in the practice of the process has the advantage of reducing the overall requirements for heat and water.

A further advantage of operating the process as a closed system is the ability to reduce the emission into the atmosphere of the organic compounds used as auxiliary blowing agents, such as methylene chloride and fluorocarbons, as well as any unreacted excess tolylene diisocyanate or other volatile reaction by-products which are vented during conventional curing. Some of these compounds can be recovered in the water from knockout unit 36. Most of the condensed products are insoluble in water and can be removed by filtration or phase separation. Excess tolylene diisocyanate will react with the water to form urea, which can be recovered as a solid. Additionally, the gas stream exiting vacuum pump 22 can be periodically treated to remove and recover accumulated high concentrations of these compounds by means (not shown) which are known in the art, such as by compression and distillation, to recover these compounds.

The process can also be practiced utilizing apparatus known to the art for passing gas streams through blocks of generally rectilinear or circular configurations which are produced by conventional continuous lateral casting methods. The apparatus can be adapted and modified in ways which will be apparent to those skilled in the art to treat other shapes employing the process.

For example, U.S. Pat. No. 3,890,414 discloses the use of a system of manifolds attached to a vacuum pump placed in contact with one gas permeable surface for drawing a gas through the block from an opposing gas permeable surface. A second manifold system is placed in contact with the opposing surface and heated saturated air or steam is introduced in the second manifold and drawn through the block by virtue of the vacuum manifold system.

The process can also be used advantageously in the rapid cooling of blocks obtained from the continuous vertical foaming of flexible cellular polyurethane material. In each of these processes, the blocks are cut into convenient lengths, usually not exceeding six feet, and usually ranging from four to five feet in length. The circumference or sides of the foam blocks generally have a skin, or outer layer comprising closed or collapsed cells, which outer layer is relatively impermeable to air when compared to the air permeability of the open-celled mass on the interior of the block. Thus, the high air permeability of the open-celled foam of the interior of the block permits a gas stream to be passed through the cut surfaces at the ends of the block, and along the axis of the block in a direction parallel to the outer surface of the block. Alternatively, the casting paper or film on which the foam forming composition is poured can be left on the block to further reduce or eliminate passage of gases, except along the principal axis of the cooling stream.

Since the fresh foam contains essentially no moisture, a certain amount of the water vapor will be retained and a weight gain is observed. An increase in moisture content from about 0.5 to 1.0% is observed and is comparable to that of foam cured by conventional methods. The moisture content can be greater if condensation occurs within, or at the periphery of the treated block. Excess moisture and condensation can be reduced or eliminated by a final purge step employing relatively drier air.

In order to demonstrate the utility and effectiveness of the improved process, a standard polyether polyurethane foam formulation was employed in the commercial production of slab stock foam. Samples of freshly made foam were cut into cubes measuring 15¼ inches on a side, (to allow for shrinkage), and the sample was placed in a test chamber similar to that illustrated in the drawing which was adapted to receive a cube measuring 15 inches on a side.

A standard or control block was conventionally cured by allowing it to cool by convection/conduction under ambient conditions, and its physical properties were determined as reported in Table 1 under the column headed "Control". The remaining columns reflect the change in the properties of the samples (measured in the same units) when subjected to the process of this invention at three flow rates and employing ambient air at a relative humidity of 40-60%; humidified air at an initial relative humidity in the range of 85-90% and temperature of 80°-150° F. and saturated air which had a relative humidity from just below to above the dew point. The temperature of the saturated air stream was in the range from about 150° -200° F. The flow rates of the cooling fluid in the following Tables are reported in relative terms as "maximum", and "half" and "quarter" of the maximum flow rate.

TABLE 1

| | CONTROL Flow | AMBIENT (40-60% R.H.) | | | HUMIDIFIED (85-90% R.H.) | | | SATURATED (±100% R.H.) | | |
|---|---|---|---|---|---|---|---|---|---|---|
| | None | Max. | Half | Qtr. | Max. | Half | Qtr. | Max. | Half | Qtr. |
| Density (pcf) | 0.87 | −.01 | +.02 | 0 | −.02 | 0 | −.02 | 0 | −.01 | +.01 |
| IFD 25% | 28 | −2.5 | −4.5 | −3.5 | +2.5 | +1.5 | +4 | +1.5 | +2.5 | +2.5 |
| Air perm, cfm | 5.8 | +.3 | +.1 | +.7 | +.6 | +1.2 | +.5 | +.2 | +.6 | +.6 |
| Tensile, psi | 9.6 | 0 | −.5 | +.3 | +.3 | +.3 | +1.7 | +1.7 | +1.5 | 0 |
| Tear strength, p/i | 1.7 | +.1 | +.2 | +.3 | +.3 | +.2 | +.3 | +.3 | +.1 | +.1 |

TABLE 2

Cooling Times - Center of Block)
(in minutes:seconds to temperature)

| Flow Temp °F. | AMBIENT | | HUMIDIFIED | | | SATURATED | | |
|---|---|---|---|---|---|---|---|---|
| | Max. | Half | Max. | Half | Qtr. | Max. | Half | Qtr. |
| 250 | 5:30 | 5:40 | 4:40 | 6:50 | 7:30 | 5:50 | 7:20 | 10:20 |
| 200 | 5:45 | 6:20 | 5:10 | 7:40 | 8:30 | 6:40 | 8:20 | 11:40 |
| 150 | 6:20 | 6:50 | 5:40 | 8:40 | 9:30 | 8:10 | 13 | 17 |
| 100 | 7:10 | 7:40 | 6:50 | 12:00 | 9:15 | 11:50 | 14 | 18 |

It was noted that flow rates using humified and saturated air streams were effected by condensation formed on the surface of the blocks. Temperature readings were taken from single thermocouple probes located in the exit side and center of the block.

TABLE 3

Cooling Times - Face of Block
(at exit of flow)

| Flow Temp °F. | AMBIENT | | HUMIDIFIED | | | SATURATED | | |
|---|---|---|---|---|---|---|---|---|
| | Max. | Half | Max. | Half | Qtr. | Max. | Half | Qtr. |
| 250 | 7:40 | 8:50 | 6:20 | 7:20 | 10:20 | 6:20 | 7:40 | 13:20 |
| 200 | 8:10 | 9:40 | 7:20 | 8:50 | 11:20 | 7:20 | 9:50 | 14:30 |

As shown by the data in Table 1, the addition of water vapor and steam to the cooling gas stream produces a foam which is slightly firmer than that which is obtained when the block is left to cool by the natural conduction/convection method conventionally employed.

A further unexpected result from the use of a gas stream containing a high concentration of water vapor in the process is an improvement in tensile properties of the final foam.

As in the case of conventionally cured foams, a certain amount of shrinkage in the foam was observed with the rapid cooling process employing steam or a saturated air stream. The extent of the shrinkage of foam blocks treated using the process of the invention does not appear to be significantly different from conventionally cured blocks.

I claim:

1. In the process for preparing an open cellular flexible polyurethane foam mass having more uniform physical properties by passing a draft of gas through the foam mass which has substantially completed the polymerization reaction in order to cool the foam rapidly and uniformly, the improvement which comprises contacting the freshly polymerized foam with a fluid coolant stream having a water vapor content which initially is in the range from slightly below to above the dew point, said stream being initially free of ammonia and amines.

2. The process of claim 1 where the initial temperature of the coolant fluid stream is from about 80° F. to 225° F.

3. The process of claim 2 where the initial temperature of the coolant fluid stream is from about 100° F. to 225° F.

4. The process of claim 1 where the fluid coolant stream employed to contact the foam mass is saturated steam.

5. The process of claim 1 where the initial temperature of the coolant fluid stream is less than the maximum internal temperature of the foam mass.

6. The process of claim 1 where the initial temperature of the fluid coolant stream is at least 25° F. less than the maximum temperature of the foam mass.

7. The process of claim 1 in which the foam mass is prepared using organic auxiliary blowing agents, where the fluid coolant stream comprises air, carbon dioxide, nitrogen, organic auxiliary blowing agents or a combination thereof.

8. The process of claim 1 where the foam is a polyether polyurethane.

9. The process of claim 1 which includes the further steps of passing the fluid coolant stream exiting the foam mass through an external heat exchanger to lower the temperature of the stream, and recycling the fluid coolant stream through the same or another foam mass.

10. The process of claim 9 which further includes the step of passing the fluid coolant stream exiting the foam mass through a knockout drum to remove condensed liquids and solids from the fluid stream.

11. The process of claim 10 which includes the further step of maintaining the water vapor content of the recycled fluid coolant in the range from slightly below to above the dew point prior to contacting the foam mass.

12. The process of claim 9 where the fluid coolant stream comprises from about 10 to 12 mole percent, or less of oxygen.

13. The process of claim 9 which includes the further step of recovering from the recycled fluid coolant stream unreacted organic compounds vaporized during the foam forming reaction.

14. The process of claim 13 wherein the organic compounds recovered are selected from the group comprising methylene chloride and chloroflurocarbons.

15. The process of claim 1 which includes the further step of contacting the foam with a fluid coolant stream of ambient air.

16. In the process for preparing an open cellular polyurethane foam mass having improved physical properties by passing a draft of gas through the freshly made foam mass which has substantially completed the polymerization reaction in order to cool the foam rapidly and uniformly, the improvement which comprises the steps of:

(a) contacting the foam with a first fluid coolant stream having a water vapor content which initially is at, or near the dew point, said stream being initially free of ammonia and amines; and (b) contacting the foam with at least one additional fluid coolant stream, said additional stream being initially free of ammonia and amines, the initial temperature of second and any successive streams being less than the temperature of the preceding stream.

17. The process of claim 16 in which the second fluid coolant stream has a water vapor content which initially is at, or near the dew point.

18. The process of claim 16 which includes the further step of contacting the foam with a fluid coolant stream comprising ambient air.

19. The process of claim 16 which includes the further steps of recovering the fluid coolant streams exiting from the foam, passing the recovered stream through an external heat exchanger to lower the temperature of the stream, and recycling the fluid coolant stream through the same or another foam mass.

20. A flexible, open cell polyurethane foam having improved tensile properties which is obtained by contacting the freshly produced foam mass which has substantially completed the polymerization reaction with a fluid coolant stream having a water vapor content which initially is essentially at, or above the dew point, said stream being initially free of ammonia and amines.

* * * * *